(12) United States Patent
Boyce

(10) Patent No.: US 7,919,037 B1
(45) Date of Patent: Apr. 5, 2011

(54) PROCESS AND COMPOSITION FOR MOLDING HEATABLE ARTICLES AND RESULTING PRODUCT

(76) Inventor: Darren Boyce, Phoenix, AZ (US)

( * ) Notice: Subject to any disclaimer, the term of this patent is extended or adjusted under 35 U.S.C. 154(b) by 1155 days.

(21) Appl. No.: 11/334,618

(22) Filed: Jan. 18, 2006

Related U.S. Application Data (60) Provisional application No. 60/645,512, filed on Jan. 19, 2005.

(51) Int. Cl.
*B29C 35/02* (2006.01)
(52) U.S. Cl. .................. 264/404; 264/105; 264/219
(58) Field of Classification Search .................. 264/104, 264/105, 403, 404
See application file for complete search history.

(56) References Cited

U.S. PATENT DOCUMENTS

| | | | | |
|---|---|---|---|---|
| 2,909,752 A * | 10/1959 | Mazzucchelli et al. | ....... | 219/553 |
| 3,644,132 A * | 2/1972 | Gelin | ........... | 174/70 S |
| 3,973,103 A * | 8/1976 | Tadewald | ...... | 219/543 |
| 4,074,222 A * | 2/1978 | Kiyokawa et al. | ......... | 338/212 |
| 4,140,461 A * | 2/1979 | Wiley et al. | .......... | 425/174.6 |
| 4,225,550 A * | 9/1980 | Karim et al. | ............ | 264/236 |
| 5,326,636 A * | 7/1994 | Durand et al. | ........ | 428/323 |
| 5,656,231 A * | 8/1997 | Blackmore | ............ | 264/408 |
| 6,063,243 A | 5/2000 | Zettl et al. | | |
| 6,183,714 B1 | 2/2001 | Smalley et al. | | |
| 6,680,016 B2 | 1/2004 | Wang | | |
| 6,706,402 B2 | 3/2004 | Rueckes | | |
| 6,743,500 B2 * | 6/2004 | Takeda et al. | ........... | 428/304.4 |
| 2005/0067406 A1 * | 3/2005 | Rajarajan et al. | ........ | 219/553 |

OTHER PUBLICATIONS

Business Week, Feb. 14, 2005 issue: "Nanotech" p. 64.
John R. Sweet article on Mold Construction.
University of Dayton—untitled article.
Zyvex.com—Website—NanoSolve Materials.

* cited by examiner

*Primary Examiner* — Richard Crispino
*Assistant Examiner* — Robert Dye
(74) *Attorney, Agent, or Firm* — Gregory J. Nelson (57) ABSTRACT

A process and a mold for molding parts. The mold is fabricated using a mixture of a viscous resin such as a gel coat containing nano particles. Electrical conductors are incorporated in the mold surface. The resulting mold in use is heatable by application of electricity to produce parts substantially reducing cure and post cure time. Completed parts containing conductive nano particles may also be produced and are heatable in use for applications where it is desirable to heat the part in use such as de-icing panels. A composition for fabricating parts containing a resin and nano particle segments in sufficient quantity to establish a conductive path is also disclosed.

11 Claims, 13 Drawing Sheets

Figure 1

A pattern or a copy of the part that is to be produced from the mold. This is coated with a release agent prior to applying first layer of heatable mold Nanotube resin/gelcoat is applied to surface. A 'barrier' layer of resin/gelcoat with or without reinforcing aminate can be applied before layer containing nanotubes is applied.

Reinforcing laminate is applied in due time to strengthen mold. Conductors may be placed in before reinforcing laminates and after nanotube layer Mold is the de-molded from plug. Mold is now a mirror image of the plug.

PROCESS AND COMPOSITION FOR MOLDING HEATABLE ARTICLES AND RESULTING PRODUCT

CROSS REFERENCE TO RELATED APPLICATION

This application is based on U.S. Provisional patent application Ser. No. 60/645,512, filed Jan. 19, 2005, of the same title.

FIELD OF THE INVENTION

The present invention relates to a process and a composition for molding various composite articles incorporating nano tubes and other electrically conductive nano particles.

BACKGROUND OF THE INVENTION

Nano technology involves extremely small structures. One type of nano structures consist of nano tubes which are single wall or multi-wall forms of carbon which are made by forming carbon atoms into a narrow, long tube. This molecular structure presents a wide range of useful properties which are useful in a number of applications because of their mechanical strength, hydrogen storage properties, electric field discharge properties. Nano tubes may be conductive or semi-conductive and manufactured or fabricated by a number of techniques, including evaporation of solid carbon by electric arc discharge. The prior art also discloses fabrication of these tubes by laser ablation, catalytic chemical vaporization or vapor deposition of carbon and catalytic decomposition of fullerenes. Fullerenes are close cage molecules composed entirely of hybridized carbons arranged in hexagons and pentagons.

Reference is made to U.S. Pat. Nos. 6,743,500; 676,870; 6,063,243 and 6,183,714 and the citations therein for discussions on various methods of fabricating nano tubes.

As mentioned above, one of the characteristics of nano tubes is their conductivity or semi-conductivity. To date, only limited application of nano tube products utilizing the conductivity have been developed.

U.S. Pat. No. 6,706,402 discloses nano tube films or articles in which an aggregation of nano tube segments are in contact with one another and define a plurality of conductive pathways along the article. The article so formed may disposed on substrates and may form an electrical network of nano tubes within the article itself.

In accordance with the present invention, the conductive characteristic of nano tubes is utilized to fabricate various polymer matrices components and articles.

BRIEF SUMMARY OF THE INVENTION

Briefly, the present invention utilizes the conductive characteristics of conductive nano particles in conjunction with molding technology, particularly the molding of articles in either an open or closed mold environment utilizing a synthetic resin such as a gel coat. A mold, according to the present invention, has a conductive nano particle network dispersed therein and molding is enhanced as the part being fabricated may be heated in the mold to accelerate curing and post curing. A completed part, fabricated using either a conventional mold or a heatable mold, may also incorporate a nano particle network so the part may be heated when placed in use.

Briefly, in accordance with one aspect of the present invention, a heatable mold for fabricating a part is made by first mixing a suitable resin such as an epoxy, gel coat or other polymer matrix resin with a quantity of conductive nano particles such as nano tubes. The term "resin mixture" is used herein to denote the mixture of nano particles with a suitable rsin or polymer matrices such as epoxy, gel coat, urethane or vinyl esters. A sufficient quantity of nano tubes is incorporated into the viscous resin mixture so that the mixture is electrically conductive. This can be determined by inserting electrical conductors into the viscous mixture and measuring the resulting conductivity by use of an ohm meter or other electrical measuring device. Viscosity can be controlled by addition of a thinner such as styrene or acetone. Once the resin and nano tube mixture has been prepared and the nano tubes dispersed in the mixture, the nano tube containing resin is applied to a prepared plug surface which is a pattern or copy of the part to be produced. Application of the nano particle mixture to the plug surface may be by spraying, brushing or other technique. Electrical conductors such as aluminum or copper strips or wires are applied to the coating at suitable spaced-apart locations. Once the initial coat is cured, the mold can be completed by applying customary reinforcing laminates such as milled glass fibers or strips of glass mat along with a suitable resin such as a polyester or vinylester resin and the mold is allowed to cure. The mold is de-molded from the plug ready for use. In use, the resulting mold may be heated by connecting the embedded conductors to a power supply to heat the gel coat, resin or epoxy applied to the mold surface to produce a part. Parts may be produced at a much greater rate than using conventional molds as the parts made on the mold may be heated to accelerate curing. Post-cure heating may also be applied. Unlike conventional molds, a mold according to the present invention both heats and cools rapidly because the nano particle containing heating layer is very thin.

As the mold is heated, the temperature is increased to assist in set and cure of applied gel coat/resin layer. Once the mold has cooled, reinforcing laminate may be applied to the part if required. Electricity may again be applied for faster cure of the laminate. Once the resin surface and any applied laminate is cured, the electricity may be stopped and allowed to cool. After the part has cured it may be de-molded or electricity may be applied again for post cure heating. After post curing, the part may be de-molded.

Parts incorporating nano particles and conductors may also be fabricated using either a heatable or a conventional mold. The embedded and dispersed particle and conductor network allows the cured part to be heated for specialized applications.

BRIEF DESCRIPTION OF THE DRAWINGS

The above and other advantages and objects of the present invention will become more apparent from the following description, claims and drawings in which:

DETAILED DESCRIPTION OF THE DRAWINGS

Figure 1:
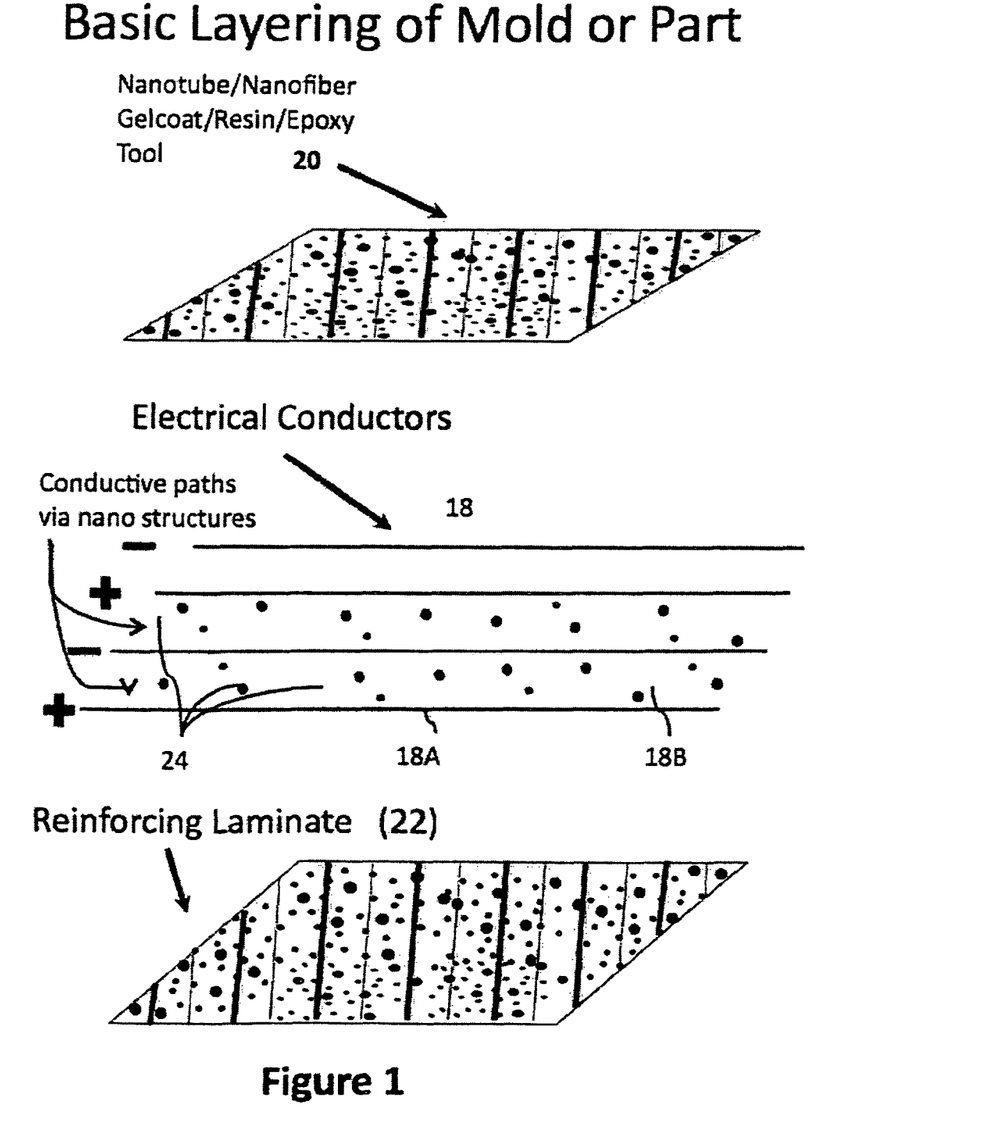
FIG. 1 schematically illustrates the layering of a heatable mold according to the present invention.
Figure 2:
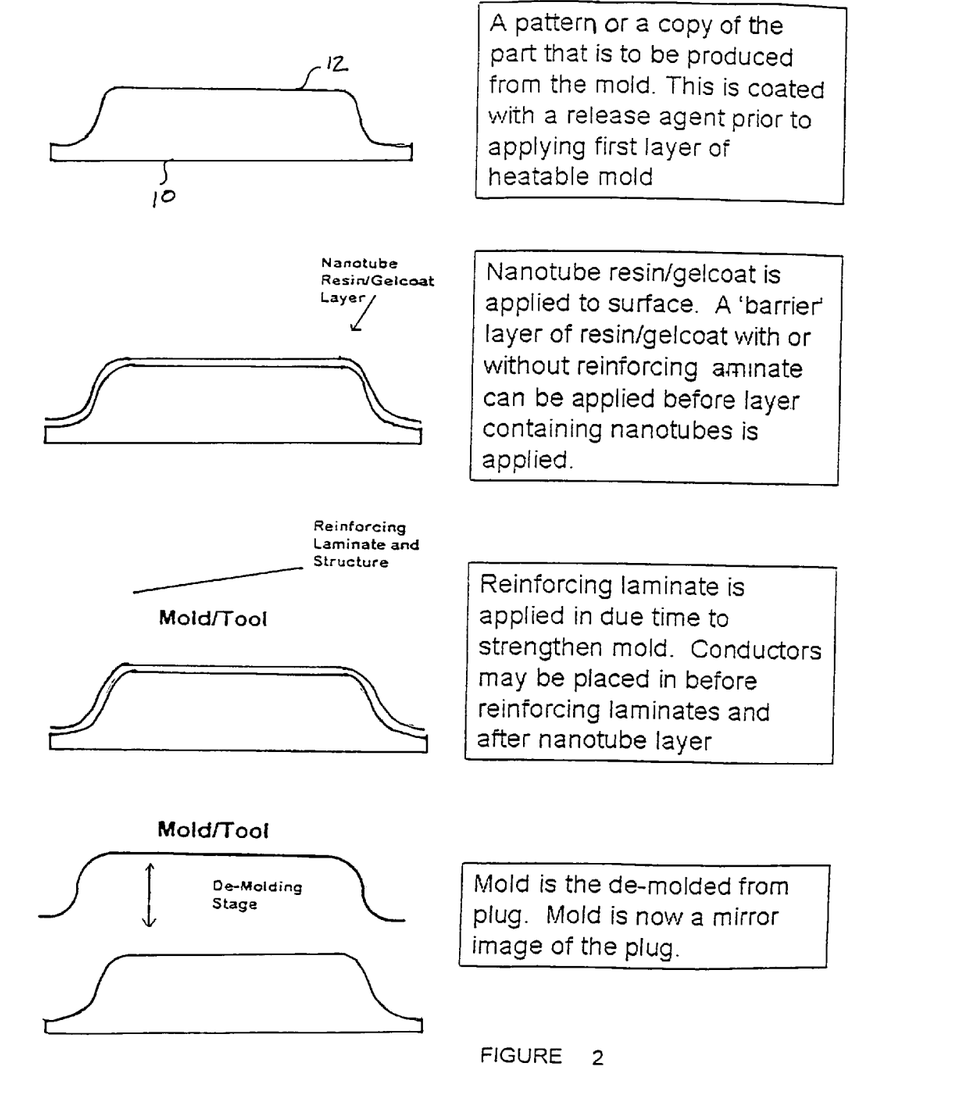
FIG. 2 schematically illustrates the fabrication of a mold according to the present invention which mold may be heated when placed in use.

Articles made by a molding process using a material such as fiberglass extend to a wide range of products such as boat hulls, tanks, vehicle components, panels and the like. In one aspect, the present invention relates to a heatable mold for fabricating a wide variety of parts. Turning now to FIGS. 1 and 2, the initial step in the process of making a heatable mold according to the present invention is to prepare a plug 10. The plug 10 is an exact model or copy of the part to be fabricated. Plugs can be made of various materials, but commonly are made of fiberglass, wood, aluminum and other materials. The plug 10 is formed having surface 12 which defines the shape of the finished mold. The mold configuration is inverted or is the negative of the part to be fabricated. For example, if the product to be made is concave, the mold will convex, as shown, so the resulting part is concave. The surface 12 of the plug 10 should be free of defects and generally should be smooth although some mold surfaces may have texture. Generally, the plug 10 is buffed and cleaned with solvent. After buffing and cleaning, it is customary to apply a suitable mold wax or other release agent. When the plug is completed, it is ready for application of a resin such as an epoxy, urethane or gel coat. "Gel coat" is a term indicating a colored resin used as a surface coat for various products such as fiberglass products and includes resins, epoxies and mixtures thereof. Representative gel coats include the following: AOC; Reichold; CCP; HK Research; Valspar and Ashland.

Although the mold preparation stages have been described with reference to the open mold, the technology can be used for closed mold applications such as Vacuum molding; RTM; VARTM; Light RTM; Zip molding, MIT molding and CCBM molding.

The liquid resin, in this case a gel coat, and a quantity of nano particles, in this case nano tubes are blended into a mixture 20. The nano tubes may be either multi-wall or single wall. Other nano particles such as metal oxides may be used. Nano tubes are carbon and therefore will typically result in the gel coat becoming dark colored or black. The exact quantity of nano tubes to be mixed in the resin may vary, but a sufficient quantity of nano tubes are incorporated in the resin so that the resulting mixture has a network of nano tubes which are electrically conductive or semi-conductive. The electrical conductivity of the nano tube and gel coat mixture can be measured by inserting electrical probes during the mixing process and measuring the resistance through the mixture by use of an electrical testing device such as an ohm meter. Once the resin or gel coat with dispersed nano tubes has been prepared, it can be applied to the surface 12 of the plug 10. A release agent is generally applied prior to applying the resin. Also a barrier layer of resin/gel coat may be applied. The resin is applied in a relatively thin, uniform layer approximately 20 to 50 mils thickness. The application may be by brush, but for most applications spraying is preferred as it provides uniform coating thickness. Spraying of a resin such as gel coat requires an air gun sprayer or special gel coat gun and the gel may have to be thinned by addition of a thinner. The gel coat may require the addition of a suitable catalyst. Once the gel coat has been applied, conventional practice is to allow the gel coat to cure over a period of time. Cure cycles for conventional gel coats depend upon ambient temperature, humidity and other factors. Gel coating cure cycles can range from 1 to 8 hours.

After curing, the complete mold 16 is ready for installation of electrical conductor such as spaced-apart wires or strips of copper or aluminum. The embedded conductors are connectable to a source of electrical energy such as a 110 VAC power supply outlet. It has been found that it is preferable to have an adjustable power supply to regulate the amount of electricity applied to the conductors. The number and location of the conductors 18 depends upon the mold size and dimensions, based on a practical working knowledge of the mold surface, mold size and conductive capability in the nano gel coat surface and power supply requirements. The electrical path is from one conductor 18A to an adjacent conductor 18B is via the dispersed nano particles 24.

The electrical conductors 18 can be placed before, during or after the mold is fully set and ready to manufacture parts. Some conductors may need to be added after the gel is applied and before the reinforcing laminate is applied and will be beneath the 20-50 mil surface of the mold. Some conductors may be added after the mold built and the resin is cured.

The resin and suitable reinforcement, such as fiberglass, urethane or similar composite laminate reinforcements 22 may be applied over the surface and conductor. Conventional lay-up of laminate and reinforcing may be applied to the back surface of the mold using conventional methods. The mold may be electrically heated to heat and cure the laminate. The result is a solid, thick (relatively) mold capable of producing many parts in the shape of the cavity 12. After the mold reinforcement is cured, the mold may be de-molded from the plug. There is now a mirror image of the 'plug' that was built and the mold surface is the smooth, cured nano resin or there may be a barrier layer over the cured resin and nano particle surface. The significant part of the process is the mold surface can be heated.

Figure 3:
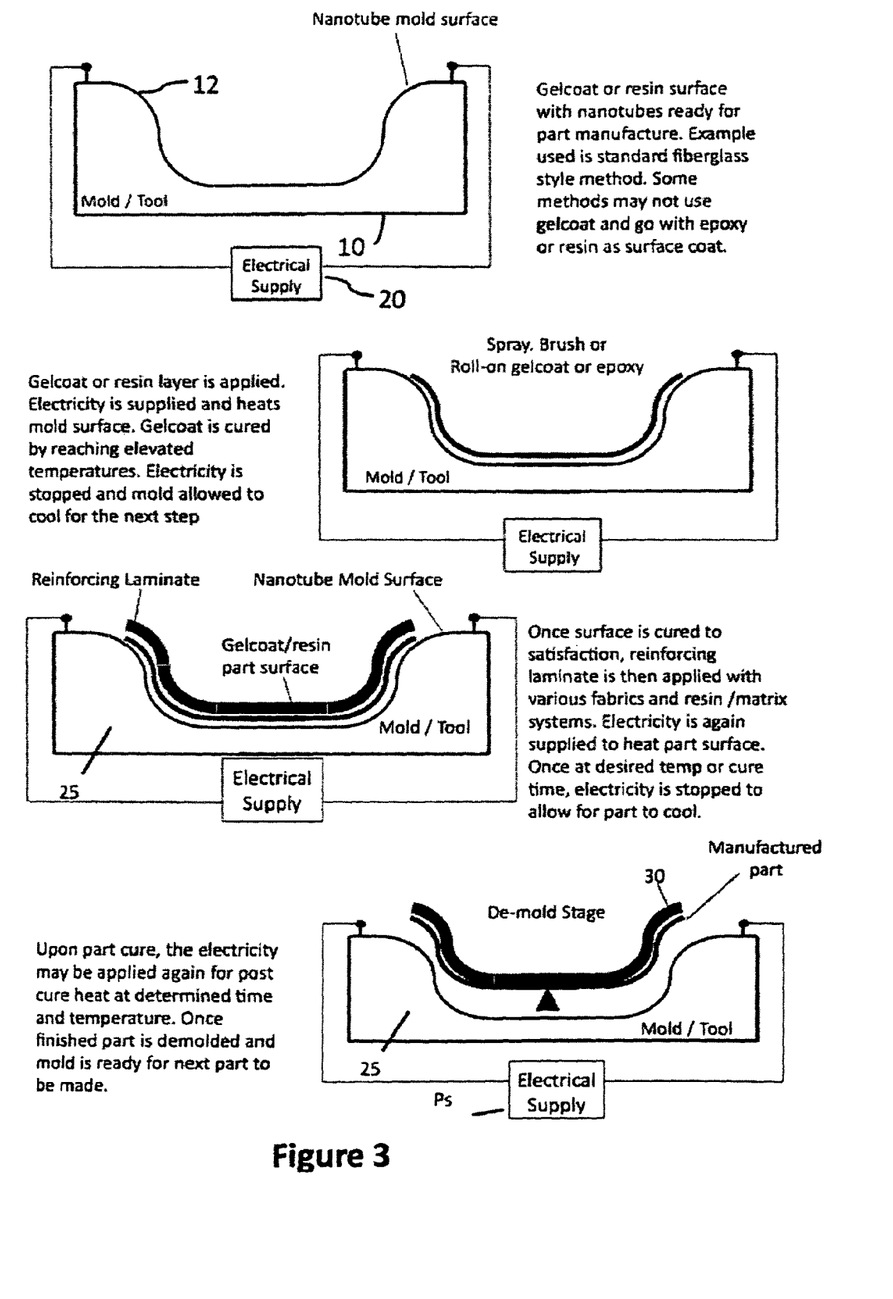
FIG. 3 schematically illustrates using a gel coat or resin containing nano particles for fabrication of part which part may be heatable when in use.

FIG. 3 illustrates a mold 25 produced by the process described above. The mold is shown in a position ready for production of components 30 conforming to the shape of the mold. Parts 30 can be fabricated in the open mold environment by applying a resin such as a gel coat to the surface of the mold. In accordance with standard practice, it may be desirable to coat the mold surface with a suitable wax or other release agent. The completed mold 25 is provided with a network of electrical conductors which are connected to a suitable source of electrical energy such as a power supply PS for providing the required amount of energy to the mold surface. The gel coat is applied by brushing, spraying or other conventional techniques. Once the gel coat is applied to the desired thickness, typically 20 to 50 mils, the mold surface is heated which will result in elevating the applied gel or resin coat to the proper thermoset or exotherm temperature. In this case, generally the part would not be heated during the molding process but will have heatable characteristics in use.

As an alternative, the applied resin coat may also be a nano tube containing resin mixture as described above. In which case, the applied resin will have a network of conductive nano particles incorporated into the mixture along with spaced-apart electrical conductors. The incorporated nano particles in the resin will result in the molded part also being heatable.

A conventional mold may also be used to produce heatable parts for applications other than parts used for molding. The process would be basically as described in which a resin coat layer containing nano structures such as nano tubes and embedded conductors is applied to the prepared surface of the mold and cured by conventional means. The part, when cured, incorporates a network of nano tubes which allow heating of the parts in use. Such parts would generally be for specialized applications such as de-icing or heating panels.

Example

Making a Mold

In order to test the present invention, the following procedure was practiced:

A mold plug was prepared having the configuration of an oil pan. A gel coat containing nano tubes was mixed. The gel coat was a gel coat available from Composites One sold under the brand Valspar®. This is a two part gel coat which was mixed in a plastic container. Nano tubes are commercially available; were incorporated in the gel coat and were mixed. Tubes of the type available from Nanocraft, Inc., and ADI (Pyrograf III) have been found to work well. The conductivity of the resulting gel coat mixture was periodically checked by inserting the probes of a ohm meter into the mixture. When the ohm meter indicated conductivity as a result of electrical resistance, the gel coat was applied to the mold surface by spraying approximately 20 to 50 mils thickness. Parallel strips of aluminum foil were extended across the mold at about 1" to 2" intervals. The gel coat was allowed to cure and reinforcing laminate applied to complete the mold structure.

Example

Making a Part

Post-Curing

Since the mold made according to the invention is heatable, it can be used as a post-curing tool when making parts. Post curing often improves and enhances the part. With resins and related components, it is known that their properties will remain constant up to the exotherm temperature (in this case about 210° F.). If the part is taken above its highest previous temperature then it may become 'soft' or move slightly. To prevent this, the heatable mold can be used to heat the part to an elevated temperature and the mold will restrain the part preventing deformation. With the invention, the mold is heatable and can operate at higher temperatures for post curing than for conventional exothermic heating. It is not necessary to pull the part from the mold and place the part in a heater, as the part can remain in the mold and cycle it up to 325° F. for post-cure heating.

Example

Making a Heatable Part

A part fabricated as outlined may also include a nano particle network. Generally, the incorporated nano particle network in the part will not be used to heat the part during molding. Rather, a completed part having heatable characteristics is used either as a mold for subsequent production or the heatable characteristics are used when the product is used. The molding can occur using an open or closed mold process. Once the part is completed and conductors embedded, as described above, the resulting part is heatable. The heatable characteristic may be highly desirable in some applications such as heating panels, de-icing panels, food service items, pool and spa industry, medical related items, automobile components and household items.

Figure 4:
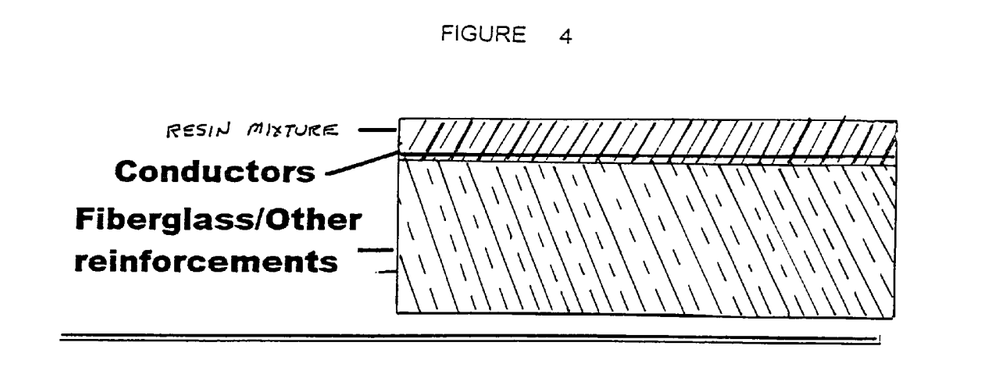
FIG. 4 shows a basic part according to the invention.

FIG. 4 shows a basic layout that has proven effective. The nano particle-containing resin mixture is laid down and allowed to cure to a tacky stage that will allow the surface to be touched without resin being removed. Once this is done, conductors, such as strips of expanded aluminum, are laid over the surface arranged in equally spaced-apart relationship. After the conductors are pressed into the surface, a layer of fiberglass or other resin is applied to 'bury' the conductors. The importance of this step is to eliminate the possibility of arcing from conductors to the resin surface. When the conductors are not in full contact with the surface, arcing may take place. Coating the back and filling in the open areas of the conductors will prevent arcing and allow the entire surface area of these conductors to transmit the current to the resistive resin surface. Once they are covered, normal laminates and fiberglass may be used build up the bulk of the mold.

Figure 5:
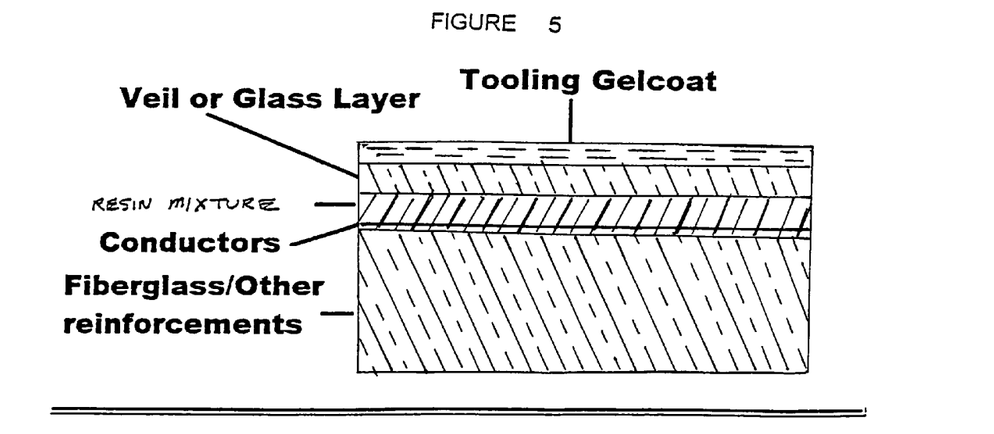
FIG. 5 shows a variation of the part shown in FIG. 4.

FIG. 5 shows an example in which the resin mixture surface is covered with a layer of tooling gelcoat and surface veil or a thin coat of fiberglass. There are a number of benefits to this lay-up. First, it shields the resin surface which is electrically conductive and helps protect accidental contact with the energized surface. The covering also provides the heated mold with a layer of protection for repair and resurfacing of the molds surface without the necessity of removing or altering the resin surface. A drawback to this method is the heating response will lag slightly compared to that shown in FIG. 4. The back of the veil or fiberglass surface should be as smooth as possible to allow for the most even distribution of the resin when applied the back of the veil or fiberglass surface.

Figure 6:
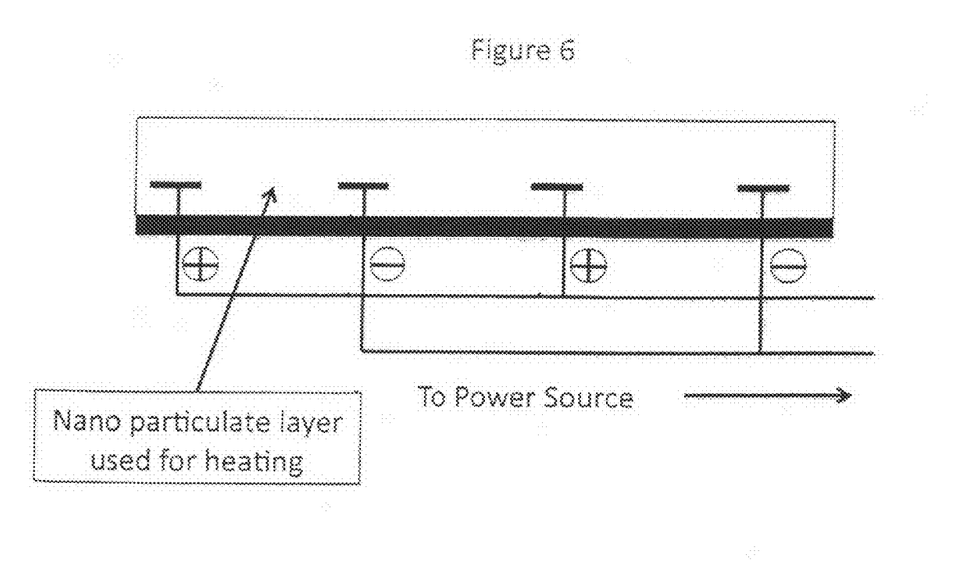
FIG. 6 illustrates a typical electrical connection.

FIG. 6 shows a basic electrical connection. The resin mixture is formulated to balance the proper electrical conduction to the amount of resistance needed to generate heat. When electricity is applied through the opposite polarities, the flow of the AC current between the positive and negative through the resistive surface generates heat. The heat is regulated by the amount of electricity applied through the control box. When the positive and negative conductors are evenly spaced, an even flow of heat will be generated through the resin mixture surface.

Figure 7:
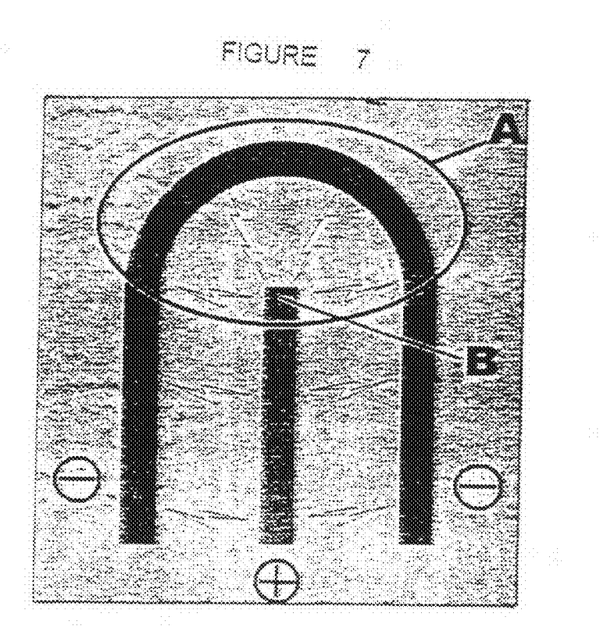
FIG. 7 shows proper conductor spacing.

FIG. 7 illustrates a limitation on the conductors' spacing. For the system to work properly, even spacing of the conductors is required. In the area of point 'A', the positive conductor is evenly spaced between the negative conductor as it wraps around the positive. This may occur when highly contoured surfaces are created and the conductors continuously bend as they are positioned of a curved surface. Although the spacing is even, point 'B' on the positive conductor will become unevenly heated since it is supplying electricity to the entire surface of the conductor in the area marked 'A'. At this point the conductors will work properly allowing uneven heating. Before this point is reached an alternative layout should be examined or a staggered layer of the resin used.

Figure 8:
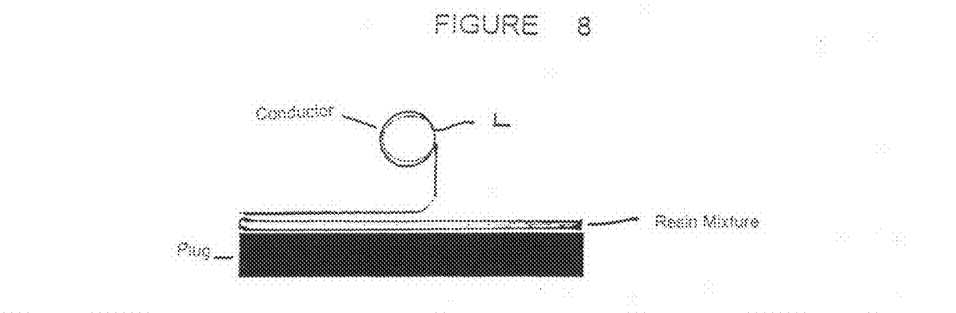
FIGS. 8 to 25 illustrate another method of producing a heatable part using looped conduction.

FIGS. 8 to 24 illustrate another method utilizing looped conductors. In FIG. 8, the conductors are shown carefully pressed onto the surface of the resin.

Figure 9:
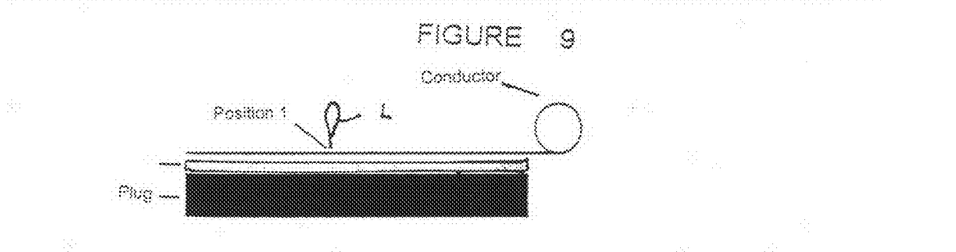

It is essential that the conductors extend the entire length of the area to be heated. In FIG. 8, the conductors are shown pulled up from the surface and loops L are formed approximately an inch above the surface, as seen in FIG. 9.

Figure 10:
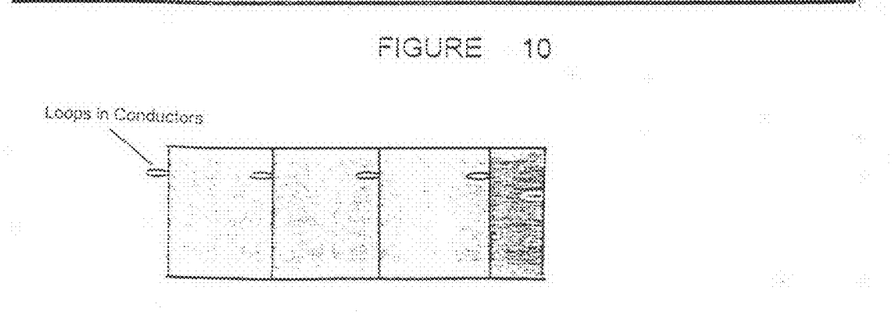

Once laid out as shown in FIG. 10, the loops L are covered with a material such as a clear plastic such as Saran Wrap® to protect against over sprayed resin on the loop section of the conductor. Another layer of resin is then applied to the mold approximately 5 mils thick.

Figure 11:
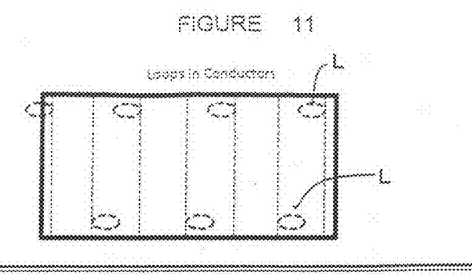

After applying the final layer of resin mixture, the protective covers can be removed as seen in FIG. 11. This will expose the bare conductors over the final layer of resin. It is critical that conductors be matched for their proper polarity with every other conductor having the same polarity.

Figure 12:
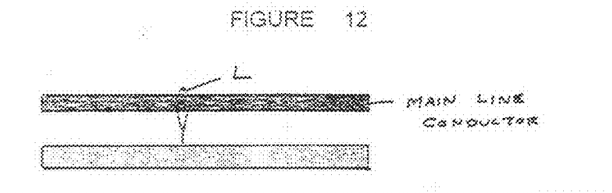
Figure 13:
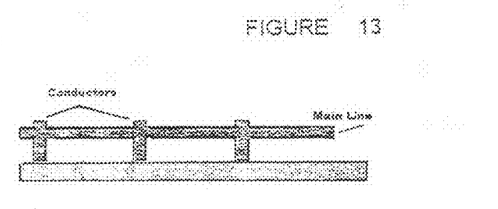
Figure 14:
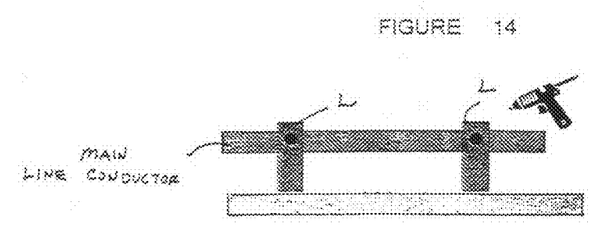

In FIG. 12, the loops are opened to allow a second conductor, termed "the main line conductor" to pass through the loops. With the main line conductor extending through the loops, the loops may then be closed by pressing the loops. One method is to bond the main line conductors to the loops using a hot glue gun. This is seen in FIG. 14.

Figure 15:
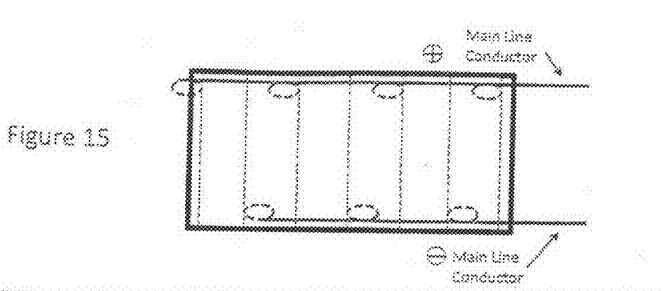

With the conductors having common polarity and are attached to the main line, the procedure is repeated for the other set of conductors to be attached to the main line having opposite polarity as seen in FIG. 15.

Figure 16:
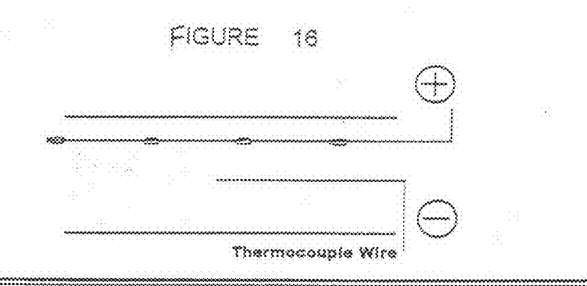

In FIG. 16, an initial layer of fiberglass to backup the resin coat has been cut. Placing the glass layer as close to the base of the loops as possible is very important. Care must be taken to not damage the loops as the base of the loops rest in a solid cured layer. If handled too harshly the conductors may break interrupting the flow of electricity through the conductors. The purpose of the fiberglass layer is twofold: first, it provides the proper reinforcing layer to back-up the resin; and second, the layers allow the conductive surfaces to be locked into place to avoid creating an electrical short. Covering the resin with standard fiberglass and resin creates an electrically insulated barrier over the surface containing the conductors. The thermocouple wire is placed within the mold over the initial layer of fiberglass. This allows for more accurate temperature readings from the mold surface.

Figure 17:
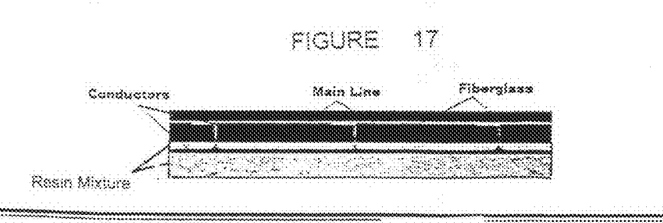

After the initial layer of fiberglass has been laid down and cured, the loops and the main line are embedded within the mold, as seen in FIG. 17. The best method is to lay down a first layer of mat or cloth and then depress the main line and loops into the wet surface, thereafter, continue to lay on the bulk laminate.

Figure 18:
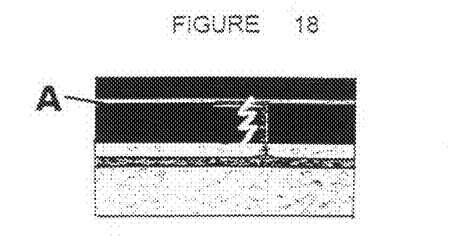

A critical step in the process is to insure that a short does not occur, as seen in FIG. 18. In the previous step, an initial layer of reinforcement was placed followed by another layer before folding over the conductors. The additional layers avoid arcing when the main line of one polarity passes over the conductor of the opposite polarity.

Figure 19:
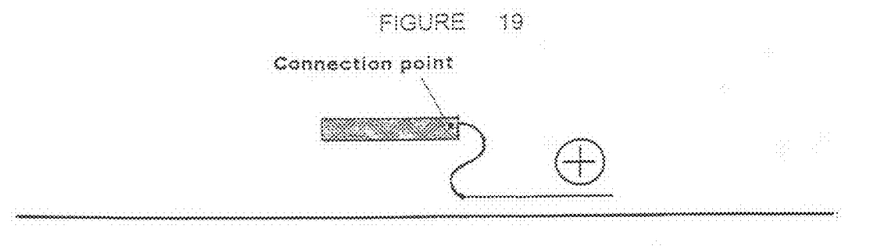
Figure 20:
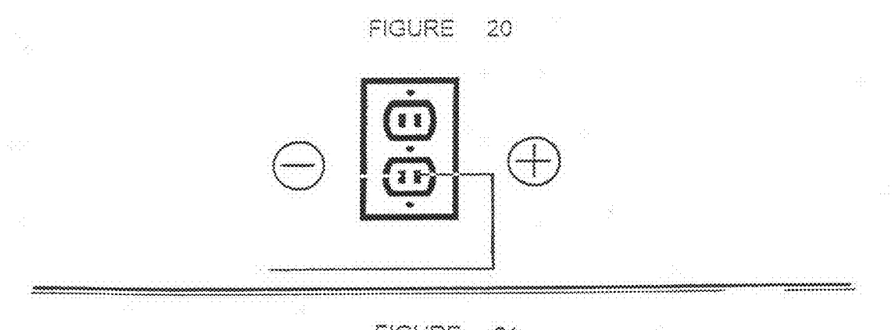

After the bulk of the mold is laid down, the main lines are attached to the connection box. As seen in FIG. 19, the connection box is shown having standard outlets and works well with round solid or stranded wire. When attaching the expanded metal conductors and round wire, a similar method is used as those when connecting the loops to the main line. The main line is wrapped around the round wire and glued together. One way to reinforce this fragile connector is to mix some resin with fumed silica to create a thick paste which is applied to the connection and then pressed onto the back surface of the mold. This will secure and protect the area where the two dissimilar wires are attached. Another method is to use silicone by casting the connection within a thick layer of silicon. The conductors may now be connected to the connection box, as seen in FIG. 20.

The box should be mounted to a secure location such as a piece of wood or glassed onto the back of the mold surface. A standard receptacle box will attach easily and provides a convenient electrical component. When the box is attached, run the connectors into the box and attach them to the appropriate outlet receptacle.

Figure 21:
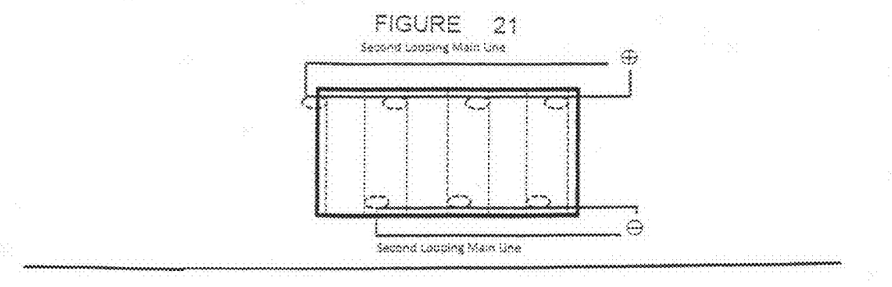

In FIG. 21, a second looping line is shown to insure uniform distribution of voltage through all conductors of the mold. This method may be used depending on the size of the mold and distance from the farthest end on a conductor to the source of electricity. In many instances, a second looping line will not be necessary, but it is a way to secure two connections to the mold in the case of a main line is severed. This method of using a second looping main line is recommended for any application.

Figure 22:
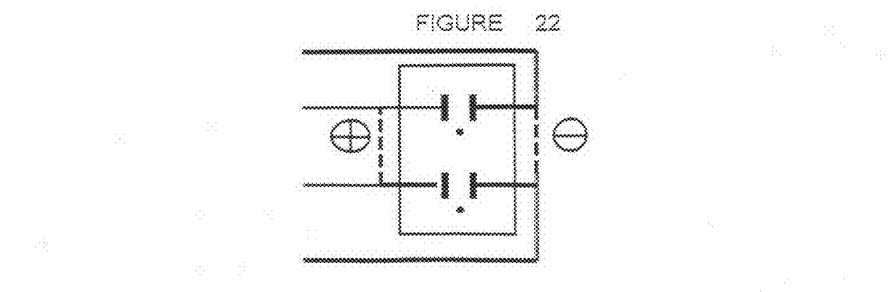

In FIG. 22, the second looping Main Line is connected to the top outlet of a receptacle. These lines may also be connected into the bottom outlet as shown by the dashed lines. If the standard outlet has not had the crossover tabs broken off the top and bottom outlets will be powered by the control box equally.

Figure 23:
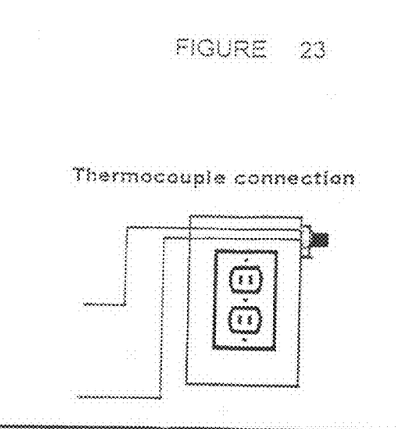

In FIG. 23, the RCA style outlet is attached to the outlet box that houses the electrical connections. This connection can be located to accommodate secure connection for the thermocouple wires. The thermocouple connection is the only connection to be made other than the electrical connections. The thermocouple has a clear wire and a red stripped wire. The Control Box is wired for the red stripped wire to be in the center prong of the male connector and center cavity on the female connector of the RCA style plug. It is important to ensure these connections are aligned properly.

Figure 24:
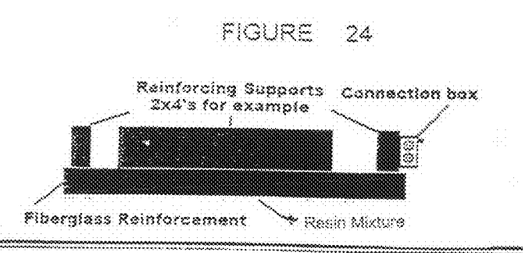

FIG. 24 shows a newly constructed mold. 2×4's are used for reinforcing the strength of the mold. The connection box is attached to one of the reinforcing 2×4's.

Figure 25:
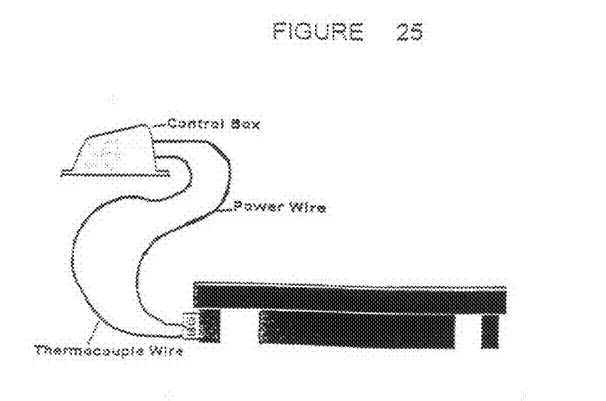

In FIG. 25, the mold is pulled from the plug and shown flipped over and connected to the control box. At this point, the control box can be powered on and a programmed or manual setting used to power up the molds heating enabled surface.

FIGS. 26 to 32 demonstrate a method for applying the heat enabled surface to a structure having a shape that does not allow the conductors to extend continuously and evenly spaced on all areas of the surface. This box shape represents corners with abrupt radiuses and angle changes. The five sides to this shape are labeled A through E with a high draft angle on all sides except side 13'. The first approach is to determine which areas are best suited for the most continuous lengths of conductor application.

Figure 26:
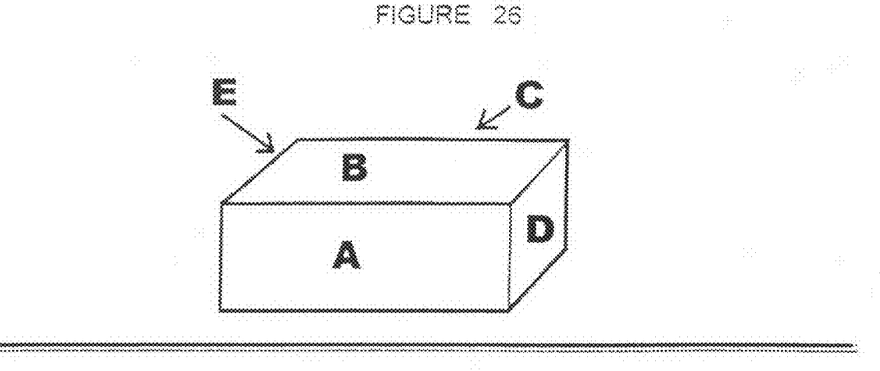
FIGS. 26 to 32 illustrate a method of applying conductors to a three-dimensional part that does not accommodate evenly or spaced-apart conduction arrangement.
Figure 27:
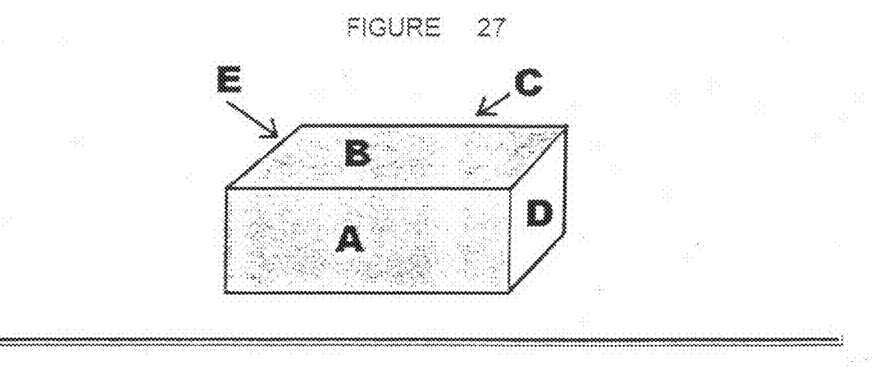

Sides A, B and C are selected as having the largest and most continuous runs for the conductors. Sides D and E are to be coated later. When shooting the resin mixture, sides D and E can be masked off or covered to protect from overspray. The resin mixture will only generate heat between conductors which are properly installed and connected to an elecrical source. The resin mixture will act as any other gelcoat when not flowing electrical current.

Figure 28:
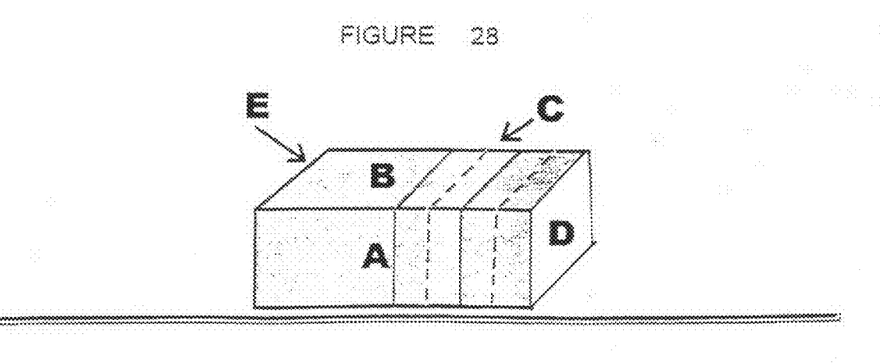

After the resin is applied, the conductor spacing is determined and the conductors are placed onto the surface. In FIG. 28, the conductors are shown beginning at the bottom of side A and extending upwardly, over and down to the opposite position on side C.

Figure 29:
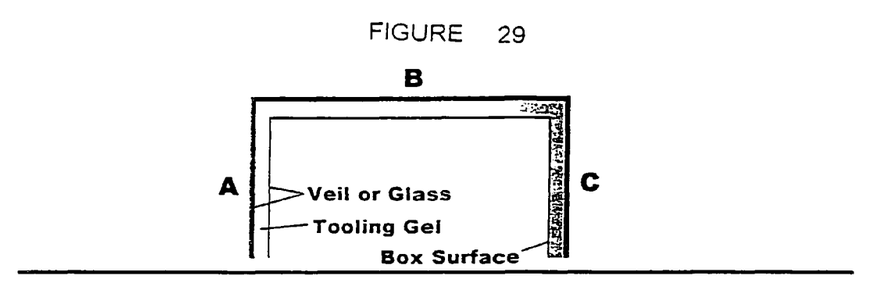

FIG. 29 is a cutaway view of the plug and mold surfaces prior to the resin application. Using a method that buries the resin surface under a layer of tooling gel and surface veil or glass. The benefits to this method provide a protective surface in front of the Heatwave and also eliminates the possibility of a shock hazard.

Figure 30:
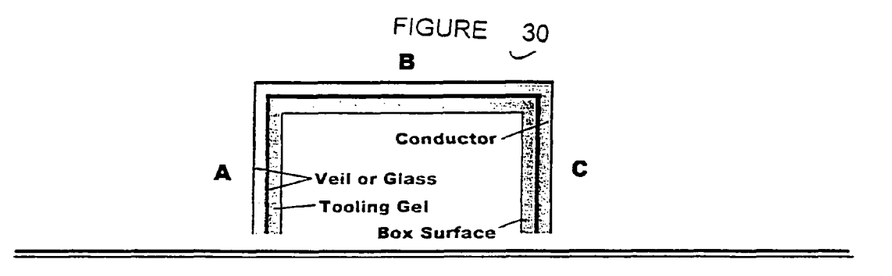

After the Heatwave application the conductors are laid in, as seen in FIG. 30, a burying layer is put down over the conductors, and once cured, a reinforcing layer is placed down to seal in the heating system.

Figure 31:
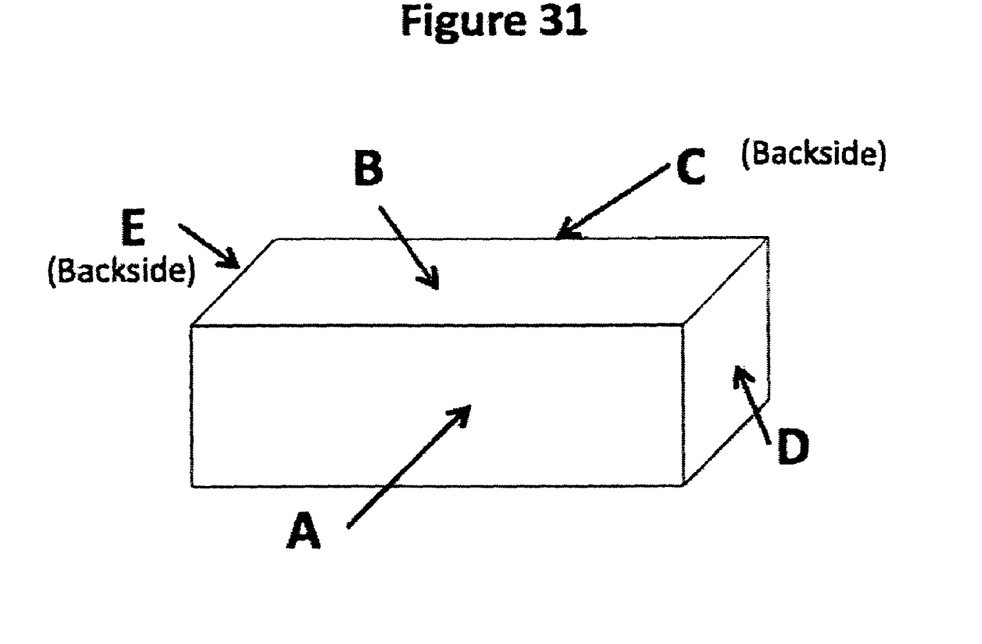

Once the sides A, B and C are covered by an insulating layer of glass the sides D and E can then be coated with the resin, as shown in FIG. 31. When sides A, B and C are completed as shown, the main line conductor should have a place to connect to. The main line can be embedded beneath the fiberglass layer with two loops or connection points available for connection to sides D and E.

Figure 32:
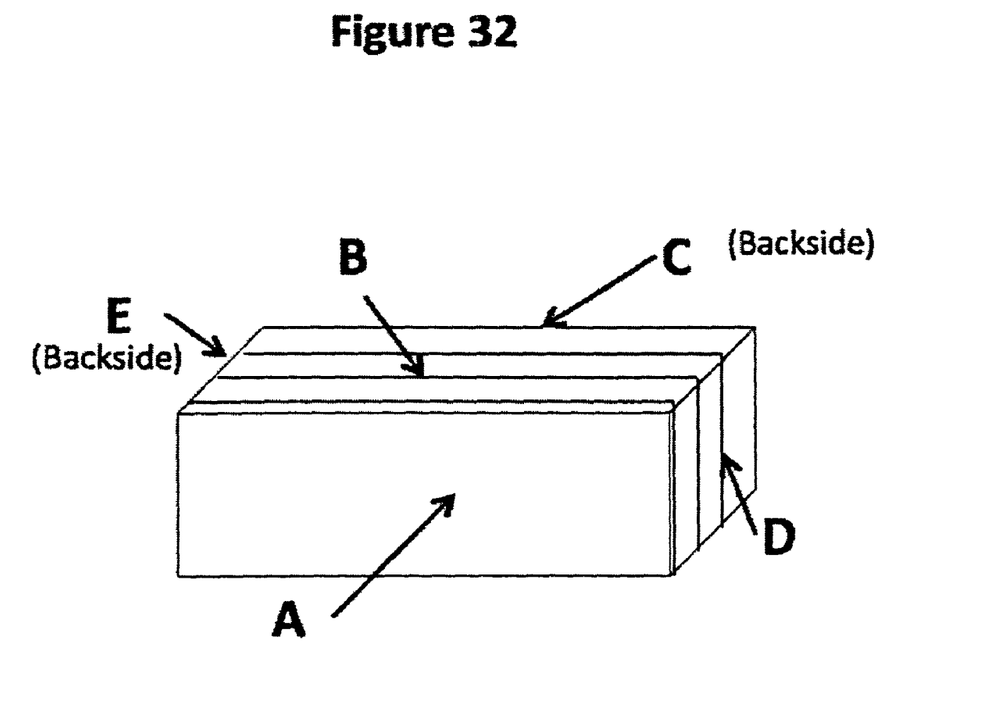

In FIG. 32, the conductors are run from the base of side D and over the top of side B and down to the bottom of side E. The conductors which transmit electricity through the surface of sides D and E are running just over the back of the resin layer on side B. If properly laid down, the layer of fiberglass on top of the resin and underneath the conductors on side B will provide insulation. The conductors should not 'short' through the layer of fiberglass due to the insulating properties of standard fiberglass resins.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A process for molding a part comprising:
   (a) providing a mold having a mold surface containing embedded elongate nano particles uniformly distributed throughout the mold and electrical conductors embedded in said mold in spaced-apart relationship extending substantially through the mold surface;
   (b) applying a resin to the mold surface;
   (c) applying electrical energy to said conductors to cause said mold surface to be heated by electrical energy flowing between said conductors via said nano particle to accelerate curing of the resin forming the part; and
   (d) de-molding the part.

2. The process of claim 1 further including the step of re-applying electrical energy to said conductors after initial curing to effect post curing in the mold.

3. The process of claim 1 wherein said resin is selected from the group consisting of gel coat, epoxies, urethanes and polymer matrices.

4. The process of claim 1 wherein said nano particles are selected from the group consisting of nano tubes and nano fibers.

5. The process of claim 1 wherein the resin mixture is cured to a state where it remains tacky and the electrical conductors are pressed into the tacky resin surface.

6. The process of claim 1 wherein the electrical conductors are comprised of strips of expanded metal.

7. A process for fabricating a heatable mold plug comprising:
   (a) combining a resin with electrically conductive nano particles in sufficient quantity to establish an electrically conductive resin mixture;
   (b) laying down a quantity of the mixture and allowing the mixture to at least partially cure;
   (c) applying first conductive member to the resin;
   (d) forming loops in said first conductive member at spaced-apart locations; and
   (e) passing a second conductive member through said loops, said conductive members being connectable to a power source according to polarity.

8. The process of claim 7 including the further step of applying a reinforcing layer embedding the loops.

9. The process of claim 7 wherein the article has a three-dimensional shape.

10. The process of claim 7 wherein the resin is selected from the group consisting of epoxies, urethanes, vinyl esters, gels and polymer matrices.

11. The process of claim 7 wherein a layer of gelcoat and a layer of fiberglass are applied prior to step (b).

* * * * *